US010670852B2

(12) United States Patent
Bellah et al.

(10) Patent No.: US 10,670,852 B2
(45) Date of Patent: Jun. 2, 2020

(54) LASER DIODE RETICLE ILLUMINATION

(71) Applicant: Lightforce USA, Inc., Orofino, ID (US)

(72) Inventors: Brian J. Bellah, Orofino, ID (US); Chad D. Beauregard, Orofino, ID (US)

(73) Assignee: Lightforce USA, Inc., Orofino, ID (US)

( * ) Notice: Subject to any disclaimer, the term of this patent is extended or adjusted under 35 U.S.C. 154(b) by 114 days.

(21) Appl. No.: 15/890,761

(22) Filed: Feb. 7, 2018

(65) Prior Publication Data
US 2018/0224649 A1    Aug. 9, 2018

Related U.S. Application Data

(60) Provisional application No. 62/456,858, filed on Feb. 9, 2017.

(51) Int. Cl.
*G02B 23/00* (2006.01)
*F41G 1/34* (2006.01)
*F21V 5/04* (2006.01)
*F21V 14/08* (2006.01)
*G02B 27/34* (2006.01)

(52) U.S. Cl.
CPC .............. *G02B 23/00* (2013.01); *F21V 5/04* (2013.01); *F21V 14/08* (2013.01); *F41G 1/345* (2013.01); *G02B 27/34* (2013.01)

(58) Field of Classification Search
CPC ...... G02B 23/105; G02B 23/00; G02B 27/34; F21V 5/04; F21V 14/08; F41G 1/345
See application file for complete search history.

(56) References Cited

U.S. PATENT DOCUMENTS

| 3,552,819 | A | * | 1/1971 | Mandler | ............... G02B 27/34 359/365 |
| 4,792,673 | A |   | 12/1988 | Blackler | |
| 6,490,060 | B1 |   | 12/2002 | Tai et al. | |
| 6,802,131 | B1 | * | 10/2004 | Scholz | ............... G01C 15/06 33/265 |
| 9,046,322 | B2 |   | 6/2015 | Justice et al. | |
| 9,523,556 | B2 |   | 12/2016 | Grace, Jr. et al. | |

(Continued)

FOREIGN PATENT DOCUMENTS

GB    2300904 A    11/1996

OTHER PUBLICATIONS

Untied States Patent Office, International Search Report & Written Opinion issued in related international application No. PCT/US2018/017386, dated May 14, 2018, 8pp.

*Primary Examiner* — Jong-Suk (James) Lee
*Assistant Examiner* — Christopher E Dunay
(74) *Attorney, Agent, or Firm* — Wood Herron & Evans LLP

(57) ABSTRACT

Provided is an illuminated reticle assembly for an optical aiming device. The assembly includes a reticle plate has a first surface on which a physical reticle pattern is applied. A laser light source is configured to project a beam of laser light into the reticle plate at a first angle and toward an inner side of a second surface at an angle of incidence that directs a reflected beam of laser light toward at least a selected portion of the physical reticle pattern. The reflected laser light illuminates the at least selected portion of the physical reticle pattern.

12 Claims, 3 Drawing Sheets

(56) References Cited

U.S. PATENT DOCUMENTS

| | | | |
|---|---|---|---|
| 9,753,268 B2* | 9/2017 | Arai | G02B 23/14 |
| 9,777,990 B2* | 10/2017 | Arai | F41G 1/345 |
| 2005/0241209 A1 | 11/2005 | Staley | |
| 2006/0092507 A1* | 5/2006 | Menges | G02B 27/34 |
| | | | 359/428 |
| 2009/0051989 A1* | 2/2009 | Dobschal | F41G 1/30 |
| | | | 359/15 |
| 2009/0109529 A1* | 4/2009 | Robitaille | F41G 1/345 |
| | | | 359/428 |
| 2011/0228395 A1* | 9/2011 | Kammans | F41G 1/345 |
| | | | 359/566 |
| 2011/0296733 A1 | 12/2011 | York | |
| 2014/0041277 A1* | 2/2014 | Hamilton | F41G 1/345 |
| | | | 42/122 |
| 2016/0102943 A1 | 4/2016 | Teetzel et al. | |
| 2016/0377378 A1 | 12/2016 | Collin | |
| 2017/0248798 A1* | 8/2017 | Zangerl | F41G 1/345 |

* cited by examiner

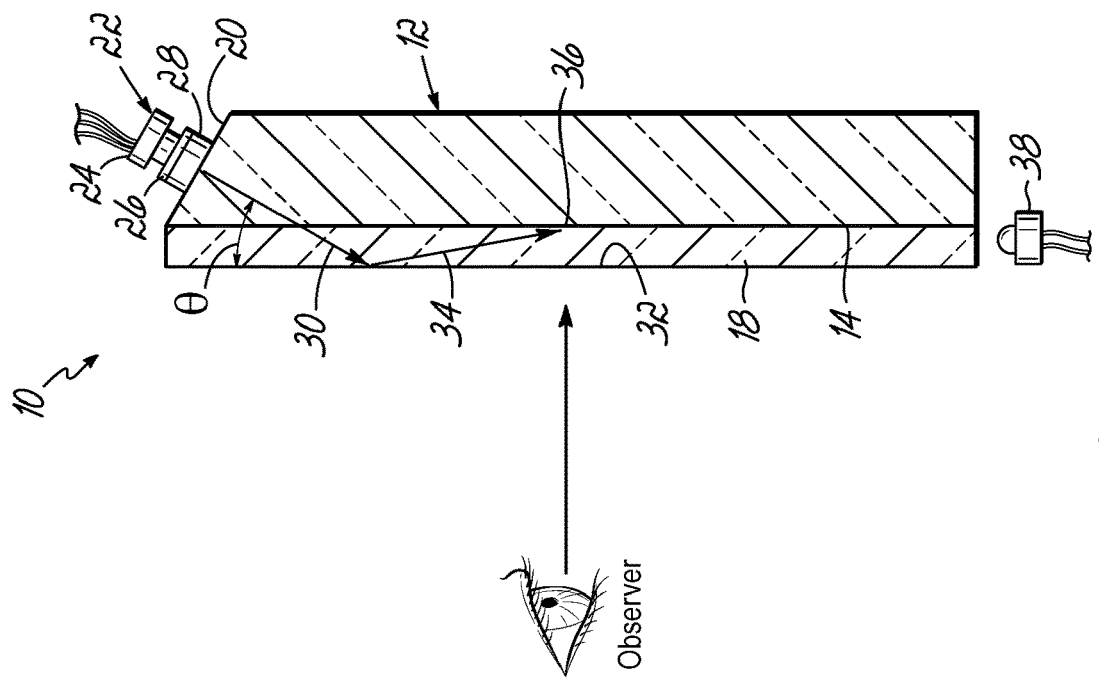
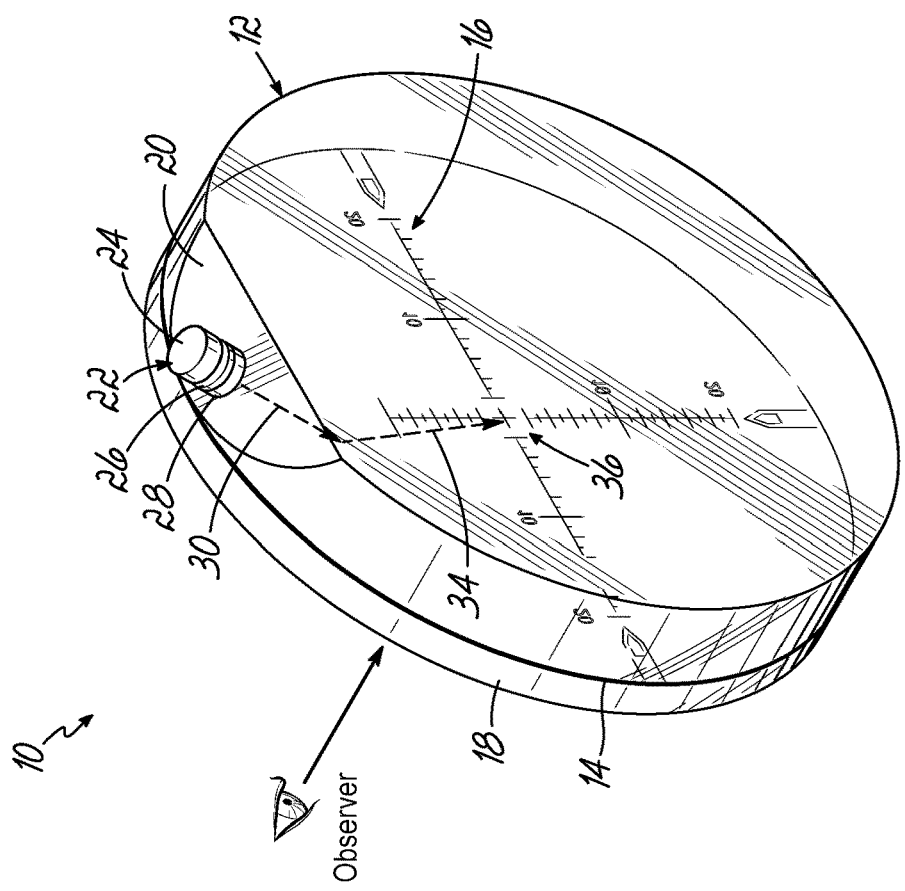
FIG. 4
FIG. 3

LASER DIODE RETICLE ILLUMINATION

RELATED APPLICATIONS

This application claims priority to U.S. Provisional Patent Application No. 62/456,858, filed Feb. 9, 2017, and incorporates the same herein by reference.

TECHNICAL FIELD

This invention relates to illuminated reticles used in optical aiming devices, such as rifle scopes. More particularly, it relates to the use of a laser diode to illuminate a specific portion or all of a reticle pattern.

BACKGROUND

Optical aiming devices, such as rifle scopes or spotting scopes, may be used in a wide range of lighting conditions. In low light conditions, it is helpful to illuminate a reticle pattern to create a greater contrast with a dark background in the field of view. It is also beneficial to illuminate a reticle pattern, or a particular portion thereof, in very bright light conditions. However, the light sources typically used for reticle illumination (e.g., a light emitting diode (LED)) may not have sufficient intensity range to properly illuminate the reticle pattern, particularity in very bright conditions, because the emitted light is dispersed to flood the reticle structure.

SUMMARY OF THE INVENTION

The present invention provides an illuminated reticle assembly for an optical aiming device, including a reticle plate having a first surface on which a physical reticle pattern is applied. A laser light source is configured to project a beam of laser light into the reticle plate at a first angle and toward an inner side of a second surface at an angle of incidence that directs a reflected beam of laser light toward at least a selected portion of the physical reticle pattern such that the reflected laser light illuminates the at least selected portion of the physical reticle pattern.

A second, non-laser light source (such as an LED) may also be used to provide a separate, lower intensity flooding light to illuminate at least different portions of the physical reticle in a traditional manner. The lower intensity light can be used to illuminate the physical reticle in low light conditions and the laser light source can be used to illuminate at least a portion of the reticle in bright light conditions. The laser and non-laser light sources may be used together to provide light of contrasting color for different potions of the reticle, if desired.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

Like reference numerals are used to indicate like parts throughout the various drawing figures, wherein:

FIG. 3 is a reversed side isometric view thereof;

FIG. 4 is a side sectional view thereof taken substantially along line 4-4 of FIG. 2;

DETAILED DESCRIPTION

Figure 1:
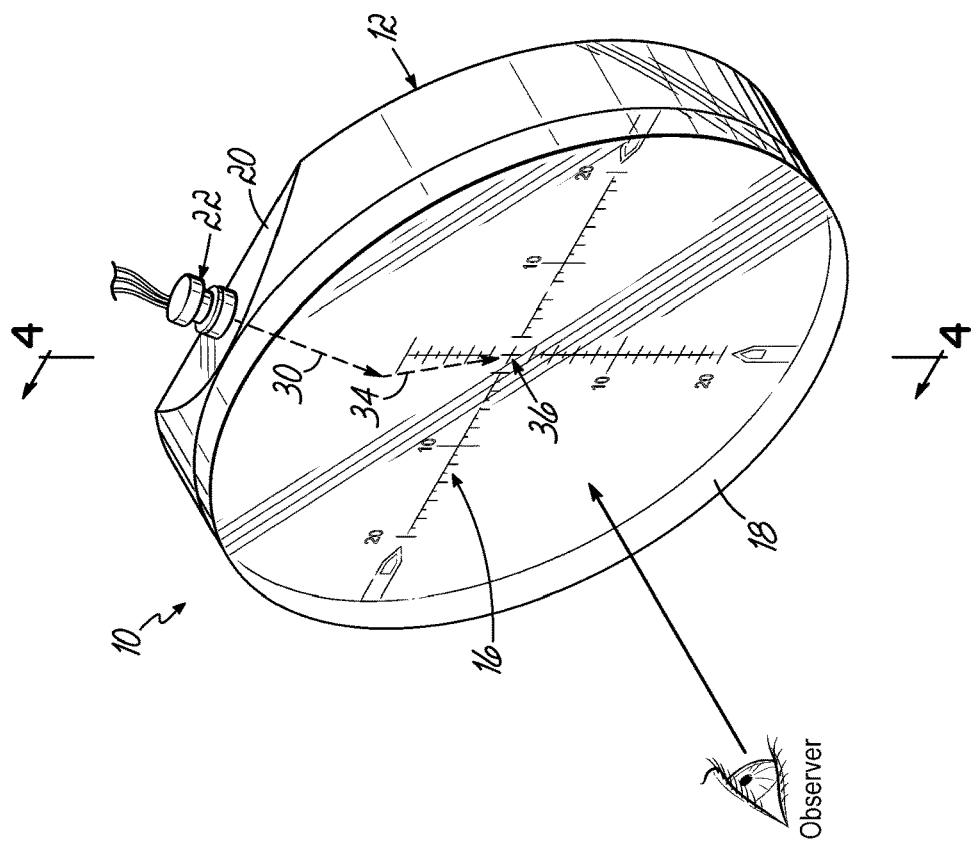
FIG. 1 is an exploded isometric view of a laser diode illuminated reticle assembly according to one embodiment of the present invention.

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Referring now to the various drawing figures, therein is shown a reticle assembly 10 according to one embodiment of the present invention. It includes a reticle substrate disc or plate 12, preferably made of high quality and clarity glass. One surface 14 of the reticle plate 12, which in the illustrated embodiment is oriented toward the ocular or viewing end of a scope (not shown) in which the assembly 10 is mounted, includes a physical reticle pattern 16. The reticle pattern 16 may be formed by a standard etched-and-fill process or any other suitable process. As used herein, "etched" includes engraving by machining or other means that removes a portion of the substrate surface. The formed pattern can be filled with any suitable reflective and/or opaque material such as chromium, paint, etc. Alternatively, part or all of the the physical reticle pattern 16 may be formed by diffraction grating. A cover glass or plate 18 can be assembled against the surface 14 of the reticle plate 12 and bonded in place, such as with a high-transparency optical adhesive cement.

The reticle plate 12 may include a beveled surface or window, such as at the periphery or on an edge thereof. In preferred form, the window 20 is formed at an angle relative to the optical viewing axis and to the surface 14 of the reticle plate 12. The window 20 may be polished, as opposed to the more commonly used ground glass edge, to minimize diffraction and allow the maximum light transmission into the glass structure. In the illustrated embodiment, the window 20 is shown at a "top" position relative to the reticle pattern 16. However, the position or orientation of the window 20 relative to the circumference of the reticle plate 12 is not important to the function of the invention.

A laser diode assembly 22 may be positioned adjacent the window 20 to project a beam of light into the glass structure perpendicular to the surface of the window and obliquely relative to the optical viewing axis and to the surface 14 of the reticle plate 12. The laser diode assembly 22 may include a laser diode 24, a laser attenuator 26, and a laser focusing lens 28. The laser diode generates monochromatic and coherent light for efficient illumination. For example, it can be red, in the 630-660 nm wavelength range. The intensity of the laser light is controlled to "eye-safe" levels by the laser attenuator 26, which can be a basic linear polarizer, because light emitted from the laser diode 24 is highly polarized. Rotating the attenuator 26 will decrease the viewed light intensity by the observer. The focusing lens 28 can be used to shape the beam of laser light to a desired size and to focus the beam to various distances in the reticle structure, allowing for variations in reticle thickness and/or feature location.

Figure 2:
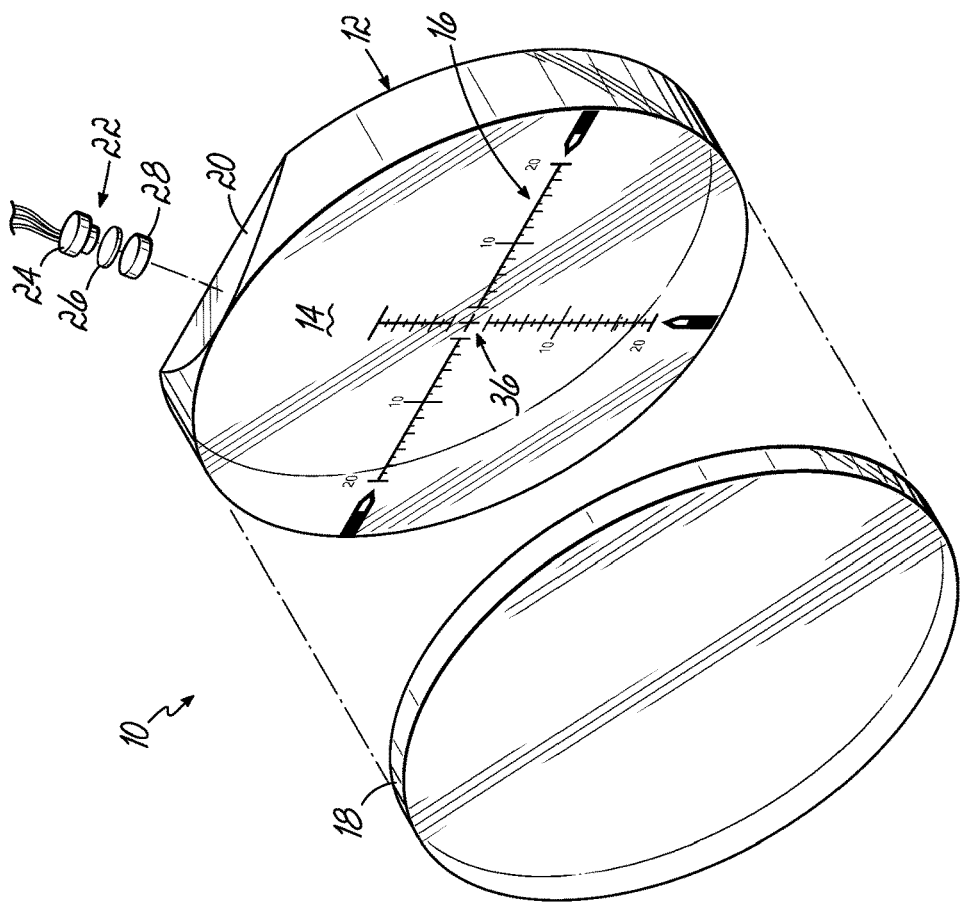
FIG. 2 is a similar assembled view thereof.

As shown in FIGS. 2-4, the attenuated and focused laser light is projected into the reticle plate 12 through the angled window 20 from an edge of the glass substrate. The cover plate 18 is of sufficient thickness to allow the focused beam of laser light 30 to have an angle of incidence (labeled θ in FIG. 4) on its inner surface 32 to induce a total internal reflection (TIR) of the light. The reflected beam 34 is then directed to the desired portion or feature of the physical reticle pattern 16. The specially illuminated reticle feature 36 can be only a portion of a larger reticle design 16 or structure and may be filled with a highly reflective paint, may be a mirrored chrome structure, or could have a controllable facet angle, allowing illumination of reticle feature 36 at a very high intensity. Alternatively, the laser light can be defocused to increase the spot size to more or all of the physical reticle pattern 16, allowing for higher intensity flood illumination than ordinary LED-type (or other traditional) illumination.

As schematically depicted in FIG. 4, a separate LED 38 or other light source can be used to generally illuminate the reticle pattern 16 by flooding the reticle plate(s) 12, 18 from an edge thereof in a traditional manner. The LED can be used separately from the laser diode 22, or both can be used together, such as to illuminate different portions of the physical reticle pattern 16 in contrasting colors and/or to provide high/low light intensity features.

Figure 6:
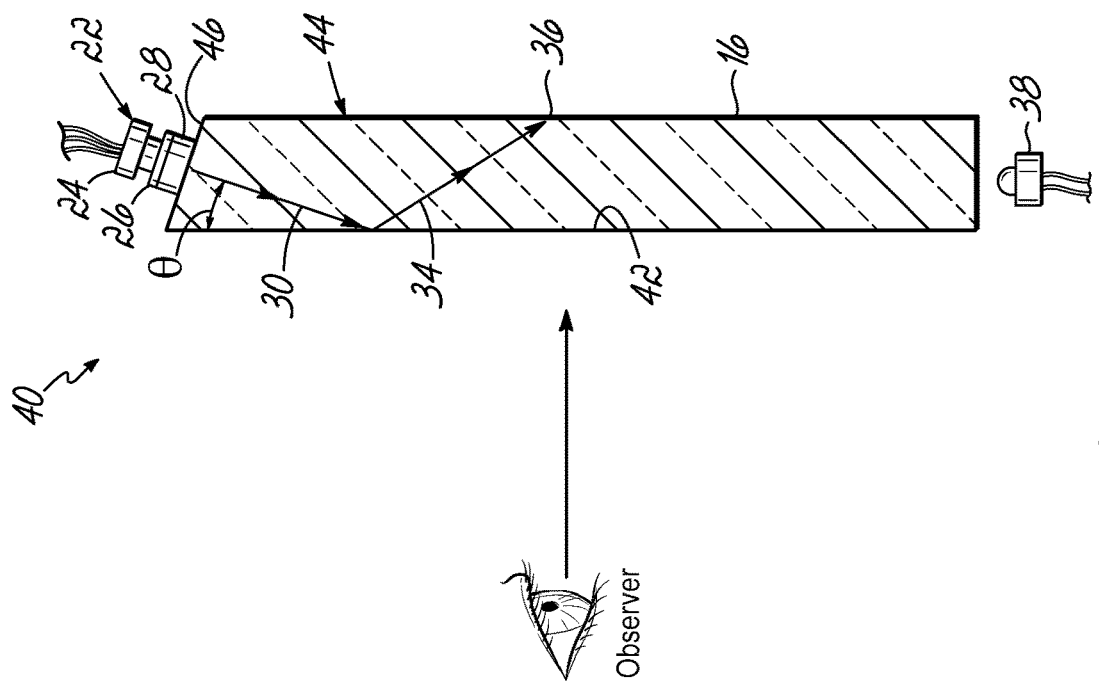
FIG. 6 is a side sectional view thereof taken substantially along line 6-6 of FIG. 5.
Figure 5:
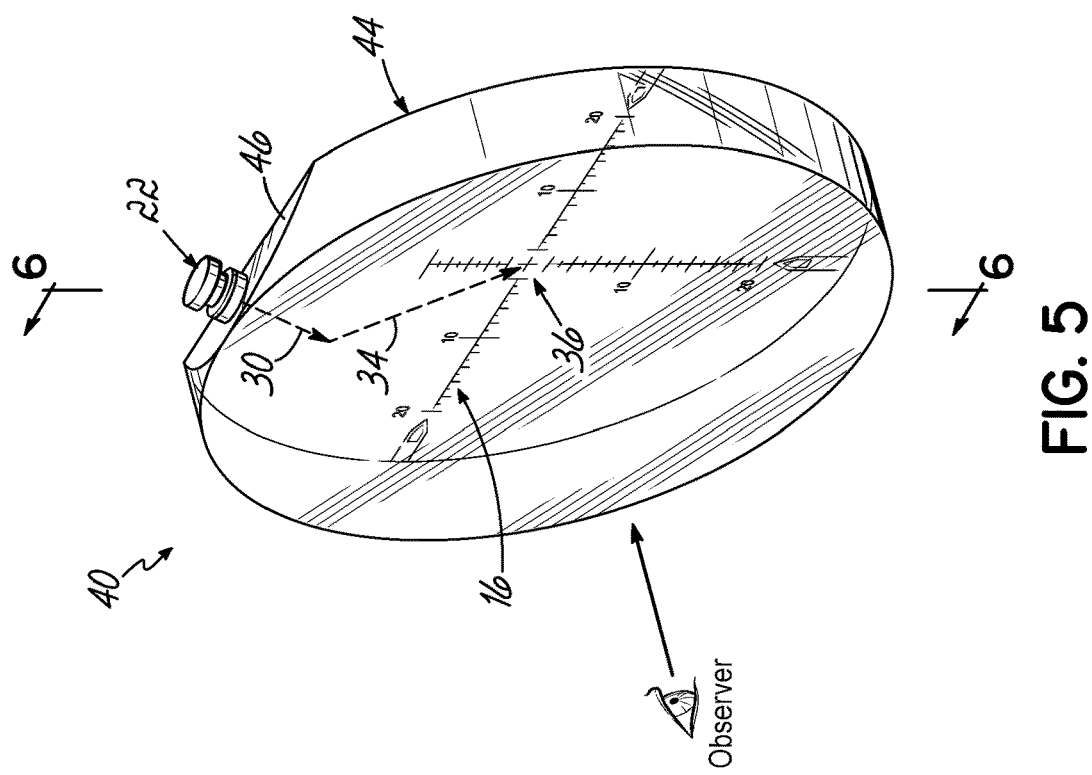
FIG. 5 is an isometric view of an alternate embodiment.

An alternate embodiment reticle assembly 40 is shown in FIGS. 5 and 6 in which the beam 30 of laser light from the laser diode assembly 26 is reflected on the internal rearward (ocular direction) surface 42 of the glass reticle plate 44. In this embodiment, the physical reticle pattern 16 is applied to or engraved on the forward (objective) side of the plate 44 and the beveled window 46 is formed at an angle that allows the angle of incidence θ to provide total internal reflection and direct the reflected beam 34 toward the illuminated feature 36. If a cover glass (not shown) to protect the physical reticle pattern 16 is desired, one can be attached to the forward (objective) side of the reticle plate 44.

While embodiments of the present invention have been described in detail, it should be apparent that modifications and variations thereto are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention, defined by the following claim or claims.

What is claimed is:

1. An illuminated reticle assembly for an optical aiming device, comprising:
   a reticle plate having a first surface on which a physical reticle pattern is applied;
   a laser light source configured to project a beam of laser light into the reticle plate at a first angle and toward a second surface at an angle of incidence that directs a reflected beam of laser light toward only a selected portion of the physical reticle pattern at a center thereof;
   a second, non-laser light source configured to illuminate the entire physical reticle pattern by flooding the reticle plate from an edge thereof;
   the reflected laser light being of higher intensity than that of the non-laser light source so as to illuminate the selected center portion of the physical reticle pattern to a higher intensity, the non-laser light source flooding the entire physical reticle pattern so as to illuminate the entire physical reticle pattern to a lower intensity.

2. The reticle assembly of claim 1, wherein the reticle plate includes a peripheral surface formed at an oblique angle to the first surface, the laser light source mounted to the peripheral surface, such that the beam of laser light projected into the reticle plate is substantially orthogonal to the peripheral surface.

3. The reticle assembly of claim 1, further comprising a lens configured to focus the beam of laser light before it is projected into the reticle plate.

4. The reticle assembly of claim 1, further comprising an attenuator to limit intensity of the projected beam of laser light to an eye-safe level.

5. The reticle assembly of claim 1, wherein the second light source is of a color contrasting with that of the laser light source.

6. The reticle assembly of claim 1, wherein the physical reticle pattern is etched on the first surface.

7. An illuminated reticle assembly for an optical aiming device, comprising:
   a reticle plate having a first surface on which a physical reticle pattern is applied;
   a cover plate secured to the first surface of the reticle plate over the physical reticle pattern;
   a laser light source configured to project a beam of laser light into the reticle plate at a first angle and toward a surface of the cover plate at an angle of incidence that directs a reflected beam of laser light toward only a selected portion of the physical reticle pattern at a center thereof;
   a second, non-laser light source configured to illuminate the entire physical reticle pattern by flooding the reticle plate from an edge thereof;
   the reflected laser light being of higher intensity than that of the non-laser light source so as to illuminate the selected center portion of the physical reticle pattern to a higher intensity, the non-laser light source flooding the entire physical reticle pattern so as to illuminate the entire physical reticle pattern to a lower intensity.

8. The reticle assembly of claim 7, wherein the reticle plate includes a peripheral surface formed at an oblique angle to the first surface, the laser light source mounted to the peripheral surface, such that the beam of laser light projected into the reticle plate is substantially orthogonal to the peripheral surface.

9. The reticle assembly of claim 7, further comprising a lens configured to focus the beam of laser light before it is projected into the reticle plate.

10. The reticle assembly of claim 7, further comprising an attenuator to limit intensity of the projected beam of laser light to an eye-safe level.

11. The reticle assembly of claim 7, wherein the second light source is of a color contrasting with that of the laser light source.

12. The reticle assembly of claim 7, wherein the physical reticle pattern is etched on the first surface.

* * * * *